Aug. 15, 1950      C. H. PRESTON      2,519,197
AUTOMATIC SAFETY DOOR LOCK FOR MOTOR VEHICLES
Filed Sept. 18, 1946      2 Sheets-Sheet 1
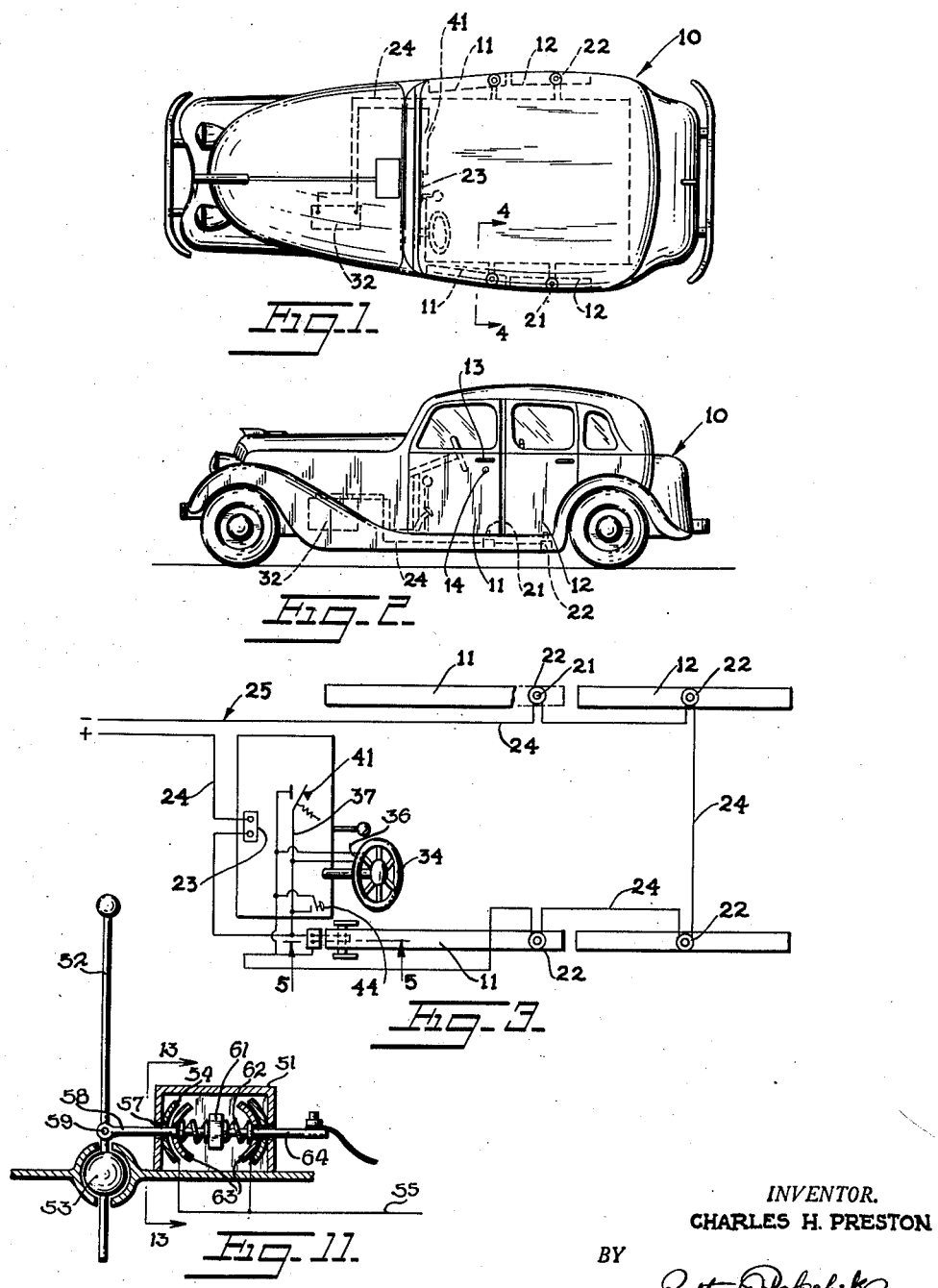
INVENTOR.
CHARLES H. PRESTON
BY
*ATTORNEY*

Aug. 15, 1950     C. H. PRESTON     2,519,197
AUTOMATIC SAFETY DOOR LOCK FOR MOTOR VEHICLES
Filed Sept. 18, 1946                2 Sheets-Sheet 2

INVENTOR.
CHARLES H. PRESTON
BY
*Golton Holachek*
ATTORNEY

Patented Aug. 15, 1950

2,519,197

UNITED STATES PATENT OFFICE 2,519,197

AUTOMATIC SAFETY DOOR LOCK FOR MOTOR VEHICLES

Charles H. Preston, New York, N. Y.

Application September 18, 1946, Serial No. 697,777

3 Claims. (Cl. 292—144)

This invention relates to locking devices and in particular to a safety door lock for motor vehicles that is adapted to operate automatically.

A particular object of the invention is to provide a safety lock for the doors of vehicles that will operate to lock the doors without attention on the part of the driver when the car is conditioned for operation as by the turning of the ignition switch to the "on" position.

Further objects of the invention include the use of a number of switch elements that may be used for carrying out various controls of the locking mechanism so that some of the doors may be locked when the driver's front door is open, the switches being mounted on the steering wheel, in connection with a foot pedal or on the dash board so that control at different points is obtainable and to provide means in connection with the switching means whereby a circuit may be held closed to maintain the locking means in locking position.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a plan view of an automotive vehicle in which a safety door lock is incorporated, the wiring diagram thereof being shown in dotted lines.

Fig. 2 is a view in side elevation of the automotive vehicle illustrated in Fig. 1 further showing the arrangement of the locking means.

Fig. 3 is a diagrammatic plan view of the doors and other parts of the vehicle illustrating the arrangement therewith of the locking circuit.

Fig. 11 is a cross sectional view of a door lock switch associated with the gear shift lever to effect locking of the door when in all positions of drive but out of engagement when in neutral.

Figure 4:
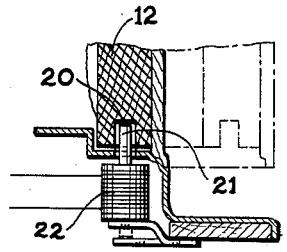
Fig. 4 is an enlarged section on the line 4—4 of Fig. 1 showing the mounting of one of the door locking solenoids.
Figure 5:
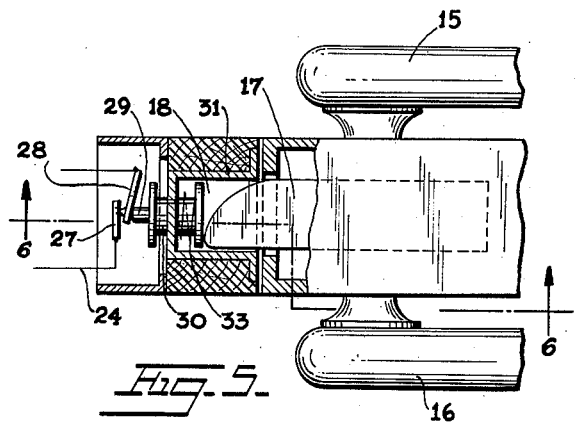
Fig. 5 is an enlarged section taken on the line 5—5 of Fig. 3 showing the switch operating mechanism of a door latch.
Figure 6:
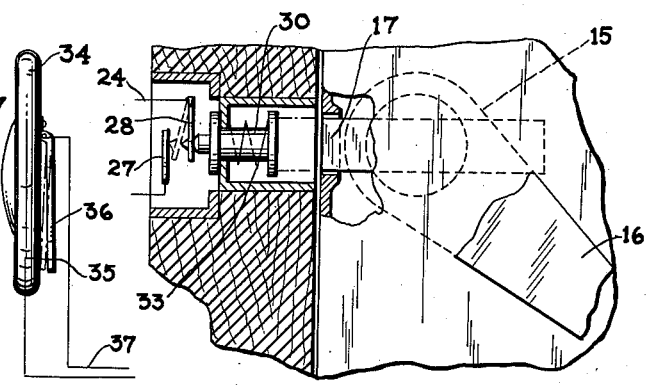
Fig. 6 is a section taken substantially on the line 6—6 of Fig. 5 showing the latch in retracted position.

Referring to the drawings in detail 10 indicates a motor vehicle having the usual front and rear doors 11 and 12, respectively, which are arranged to be retained in closed position by the door latches 13, the front or the driver's door being provided with a key lock 14 that prevents unlatching motion of the latch handle 16. The construction of the latch and its operating lock being well known, are not illustrated, except as shown in the Figs. 5 and 6 in which the inner latch handle 15 is connected to the outer latch handle 16 for operation of the latch 17 against the resistance of a spring, not shown, to engage in a latch socket 18 in which is mounted one of the control switches to be described.

Either of the latch handles 15 or 16 may be operated manually to open the door from inside or outside the vehicle and lock 14 (Fig. 2) may be used to prevent such operation. Each of the doors is provided in the bottom edge thereof with a bore 20 into which the core 21 of a solenoid 22 is arranged to be projected when the solenoid is energized by the closing of the ignition switch 23 which is included in the positive side 24 of a circuit 25 that includes one solenoid for each of the four doors of the car.

In order that the doors may be positively locked when the car is moving or is ready to be operated, the ignition switch 23 is turned to the "on" position to complete a circuit through the line 24, to the switch contact 27. The switch contact 27 is engaged by the switch contact 28 when the pin end 29 of a spring pressed bolt 30 advances into the latch socket housing 31 by the projecting snap action of the latch 17 when the driver's door is shut. When the switch 28 is closed, the circuit is completed from battery 32 through line 24 and each of the solenoids 22 is energized to project its core into a bore 20 to lock each of the doors of the vehicle.

With the operation of the handles 15 and 16, it is possible for the driver to leave the vehicle with children in the back seat thereof and the front door being closed will, through its latch, maintain the circuit to keep the doors locked. In this way a safety device is provided for the protection of small children left in the car and this protection is afforded during the travel of the car because the circuit is maintained through all of the solenoids as long as the ignition switch is in the "on" position.

Figures 7, 8:
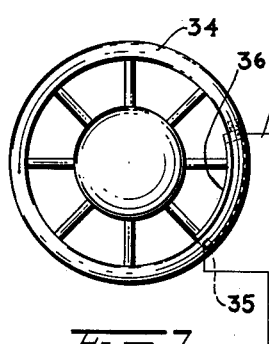
Fig. 7 is a plan view of the steering wheel illustrating the attachment thereto of a switching means.
Fig. 8 is an edge view of the wheel illustrated in Fig. 7 further showing the mounting of the switch.
Figure 9:
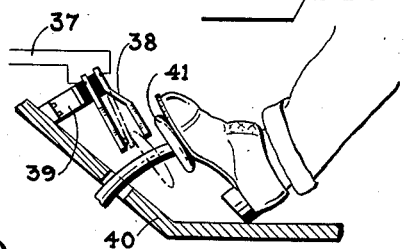
Fig. 9 is a view in sectional elevation, taken through the floor of the car, showing the use of a pedal controlled switch.
Figure 10:
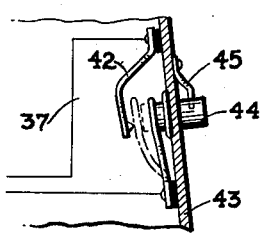
Fig. 10 is a view in sectional elevation taken through the dash illustrating the use of a button switch controlling means.
Figure 12:
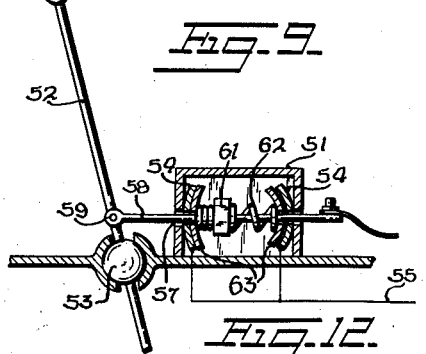
Fig. 12 is a similar cross sectional view where the gear shift lever has been moved to one side to make a contact and establish a circuit.
Figure 13:
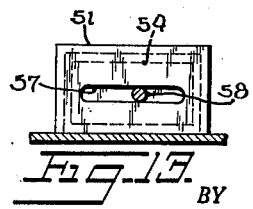
Fig. 13 is a view looking upon the side of the switch box through which the rod bearing the spring contacts extends for connection with the gear shift lever, the view being taken along line 13—13 of Fig. 11 and looking in the direction of the arrows thereof.

In an emergency, the driver simply operates the inside latch handle 15 and the spring 33 will retract the bolt 30 and release the switch contact 28 to move away from the switch contact 27 and break the circuit in the line 24. The circuit is provided with a number of controlling elements in addition to that afforded by the operation of the door latch and in Fig. 8 the steering wheel 34 has mounted thereon a contact 35 and a spring switch arm 36 which, being pivotally disposed on the underside of the wheel may operate by gravity to maintain the circuit open or may yieldably resist closing operation by its flexible nature. The said switch is included in the line 37 which has connection to the line 24 and in this line 37 there is also included, as illustrated in Fig. 9, a switch 38 mounted on a bracket 39 connected to the floor 30 of the car in position to be operated by a foot pedal 41. When the latter is depressed, the switch 38 is closed and maintains the circuit closed as long as the foot pedal is depressed.

The line 37 further includes switch members 42 which are mounted on the dash 43 of the car in which a button 44 is mounted for inward movement against the flexible action of the switch 42 to close the same, the button being maintained in its depressed or switch closing position by a suitable detent 45 pivoted to the dash adjacent said button and movable to overlie said button.

Referring now to Figs. 11, 12 and 13, 51 is a switch box located on the floor of the operator's station of the vehicle adjacent a gear shift lever 52 having a universal ball and socket joint 53 at its lower end and in its connection with the floor. The lower end of the lever engages with the transmission under the floor.

The switch box 51 has on each of its side walls a concaved contact plate 54 connected in common with a wire 55. These contact plates have a slot through them and there are slots 57 through the wall by which a rod 58 can extend through the switch device. This rod 58 is connected to the lever 52 as indicated at 59 to be operated by the lever 52. The rod has a central shoulder portion 61 within the switch box station 51 against which spring 62 abuts to keep a convex contact terminal 63 against a cotter pin 64 on the shaft 58.

There is a contact terminal 63 for each of the contact plates 54. As long as the gear shift lever remains in the neutral position as shown in Fig. 11, no contact is made between terminals and the doors will be unlatched. When the gear shift lever is moved to one side or the other to put the vehicle in motion contact of one of the opposing terminals 63 is made with one of the stationary contact plates 54 whereby to establish a circuit and cause the doors to be locked. The rod 58 will slide along the elongated slot 57. If the lever 52 is moved to the opposite inclined position than that shown in Fig. 12 engagement of the contacts at the right side of the switch box will be made.

As long as the vehicle is in gear the doors will be locked. When the gear lever is placed in neutral the doors will become unlocked. If it is desired to leave the doors locked by the magnets when parking the vehicle the gear shift lever can be left in gear. Automatically all doors will be locked. Only when the key is used to open the key door will the circuit be broken to release the solenoids.

It is evident that through the medium of any of the switches 36, 38, 42 or 51 that the doors of the car may be locked even though the front door at the driver's side is open so that in a road emergency, for instance, where the driver desires to change tires and prevent children from leaving the car, operation of the button 44 and its detent 45 will maintain the circuit. If for any reason the driver wishes to open the front door without releasing the solenoid locks of the other doors, he may do so by operating the driving wheel switch 36, the foot pedal 41 or the button 44.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In a vehicle having a plurality of doors one of which has a manually operable door latch including a slidable bolt engaging in a keeper formed in an adjoining part of the vehicle and means for retracting the bolt from the keeper, a solenoid mounted on the vehicle adjacent each of the doors, each solenoid having a slidably mounted core arranged to move toward its respective door when the solenoid is energized, each door being formed with a bore into which the core is arranged to engage when moved by energization of the respective solenoid for locking the doors closed, a circuit connecting in series each of the solenoids and a source of electrical energy for energizing the solenoids, a pair of normally open contacts connected in series in said circuit and positioned adjacent the keeper, and means operated by the bolt when extended into said keeper for closing said manually open contacts to close the circuit and energize said solenoids and extend said cores to lock the doors in their closed position, whereby when the bolt is retracted from the keeper the normally open contacts will reopen breaking said circuit freeing said cores to move out of said bores releasing the doors to be opened.

2. In a vehicle having a plurality of doors one of which has a manually operable door latch including a slidable bolt engaging in a keeper formed in an adjoining part of the vehicle and means for retracting the bolt from the keeper, a solenoid mounted on the vehicle adjacent each of the doors, each solenoid having a slidably mounted core arranged to move toward its respective door when the solenoid is energized, each door being formed with a bore into which the core is arranged to engage when moved by energization of the respective solenoid for locking the doors closed, a circuit connecting in series each of the solenoids and a source of electrical energy for energizing the solenoids, a pair of normally open contacts connected in series in said circuit and positioned adjacent the keeper, and means operated by the bolt when extended into said keeper for closing said manually open contacts to close the circuit and energize said solenoids and extend said cores to lock the doors in their closed position, whereby when the bolt is retracted from the keeper the normally open contacts will re-open breaking said circuit freeing said cores to move out of said bores releasing the doors to be opened, said means comprising a slidably mounted bolt positioned adjacent said normally open contacts to be engaged and moved by the bolt of the door latch when extended into the keeper in a direction to close the normally open contacts.

3. In a vehicle having a plurality of doors one of which has a manually operable door latch including a slidable bolt engaging in a keeper formed in an adjoining part of the vehicle and means for retracting the bolt from the keeper, a solenoid mounted on the vehicle adjacent each of the doors, each solenoid having a slidably mounted core arranged to move toward its respective door when the solenoid is energized, each door being formed with a bore into which the core is arranged to engage when moved by energization of the respective solenoid for locking the doors closed, a circuit connecting in series each of the solenoids and a source of electrical energy for energizing the solenoids, a pair of normally open contacts connected in series in said circuit and positioned adjacent the keeper, and means operated by the bolt when extended into said keeper for closing said manually open contacts to close the circuit and energize said solenoids and extend said cores to lock the doors in their closed position, whereby when the bolt is retracted from the keeper the normally open contacts will re-open breaking said circuit freeing said cores to move out of said bores releasing the doors to be opened, said means comprising a slidably mounted bolt positioned adjacent said normally open contacts to be engaged and moved by the bolt of the door latch when extended into the keeper in a direction to close the normally open contacts, said second slidably mounted bolt being spring pressed in a direction away from the normally open contacts.

CHARLES H. PRESTON.

REFERENCES CITED

The following references are of record in the file of this patent:

UNITED STATES PATENTS

| Number | Name | Date |
|---|---|---|
| 1,580,722 | Greathouse | Apr. 13, 1926 |
| 1,833,572 | Hardesty | Nov. 24, 1931 |
| 2,035,895 | Kelly | Mar. 31, 1936 |
| 2,105,350 | Fitzgerald | Jan. 11, 1938 |
| 2,130,559 | Papp | Sept. 20, 1938 |
| 2,162,567 | Shobel et al. | June 13, 1939 |
| 2,314,815 | Brandt | Mar. 23, 1943 |